M. AMIDON & E. N. McKIMM.
HORSE DETACHER.

No. 190,461. Patented May 8, 1877.

WITNESSES:
E. Wolff
J. H. Scarborough

INVENTOR:
M. Amidon
E. N. McKimm
BY
ATTORNEYS.

UNITED STATES PATENT OFFICE.

MOSES AMIDON AND EDGAR N. McKIMM, OF LATHROP, MISSOURI.

IMPROVEMENT IN HORSE-DETACHERS.

Specification forming part of Letters Patent No. 190,461, dated May 8, 1877; application filed April 9, 1877.

*To all whom it may concern:*

Figure 1:
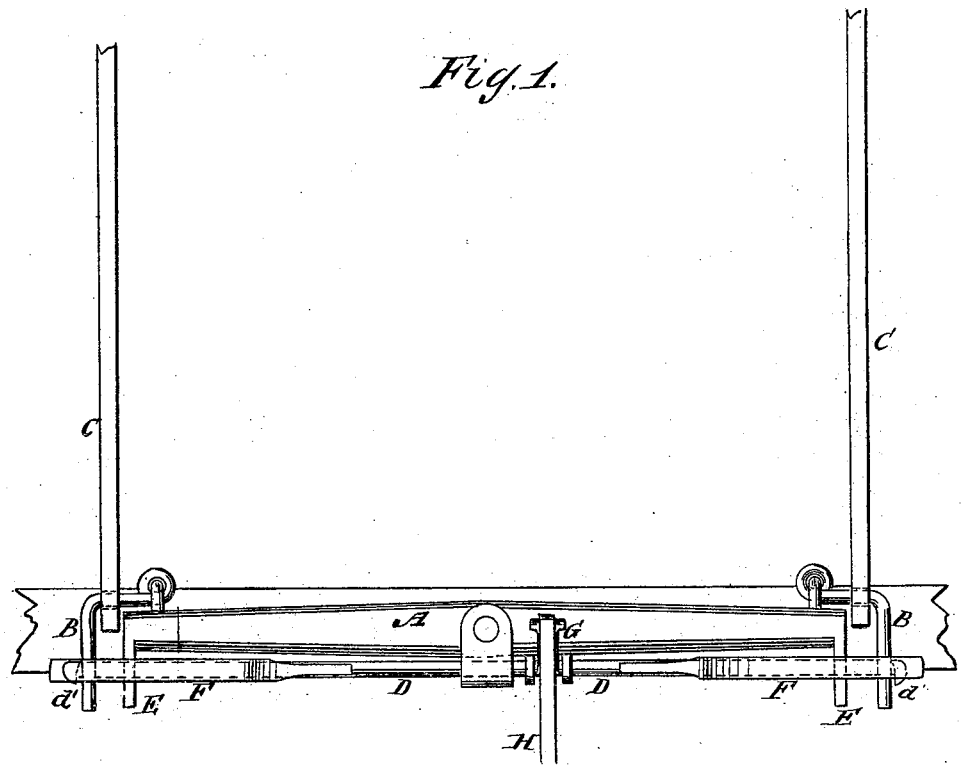
Figure 2:
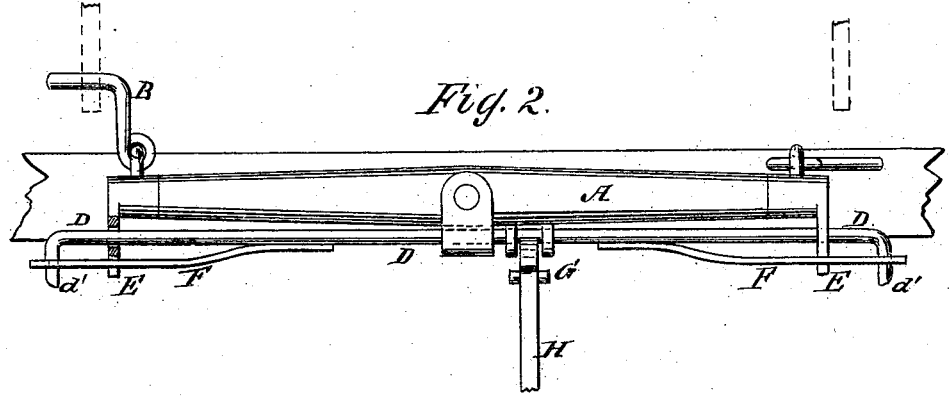

Be it known that we, MOSES AMIDON and EDGAR N. McKIMM, of Lathrop, in the county of Clinton and State of Missouri, have invented a new and useful Improvement in Whiffletrees, of which the following is a specification:

Figure 1 is a top view of my improved whiffletree, showing the traces attached. Fig. 2 is the same view as Fig. 1, but showing it with the traces detached.

Similar letters of reference indicate corresponding parts.

The object of this invention is to furnish whiffletrees which shall be so constructed that the traces may be instantly released and the horse allowed to go free should he become frightened or unmanageable from other cause.

The invention consists in the combination of the pivoted hooks, the rod provided with hooks at its ends, the bearing-plates or arms, the springs, the rigid arm, and the strap with each other, and the whiffletree, as hereinafter fully described.

A represents a whiffletree, which is pivoted to the cross-bar of the thills in the usual way. To the forward side of the ends of the whiffletree A are pivoted two right-angled hooks, B, which are passed through holes in the traces C, and their ends are placed in the hooks $d'$ formed upon the ends of the rod D. The rod D is placed at the rear side of the whiffletree A, and passes through and works in holes in small plates or arms E attached to the rear side of the ends of the whiffletree A, or to ferrules attached to said ends. The hooks B are held in place in the hooks $d'$ by springs F attached to the rod D, and which pass above the plates or arms E. To the rod D is rigidly attached an upwardly-projecting arm, G, to the end of which is attached a strap, H, which extends back to the carriage, and is secured in such a position that it may be readily reached and operated by the driver.

With this construction, by pulling lightly upon the strap H, the rod D will be turned, turning the hooks $d'$ backward and downward, while the springs F are held by the plates or arms E. This releases the hooks B, and allows the traces C to slip from them, and the horse is detached.

Having thus described our invention, we claim as new and desire to secure by Letters Patent—

The combination of the pivoted hooks B, the rod D provided with hooks $d'$ at its ends, the plates or arms E, the springs F, the arm G, and the strap H, with each other, and the whiffletree A, substantially as herein shown and described.

MOSES AMIDON.
EDGAR N. McKIMM.

Witnesses:
D. E. MAIN,
J. SOMERS.